No. 739,759. PATENTED SEPT. 22, 1903.
F. R. STAFFORD.
GEM SETTING.
APPLICATION FILED SEPT. 28, 1901.
NO MODEL. 2 SHEETS—SHEET 1.
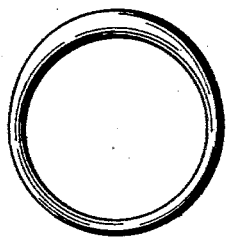
FIG. 1.
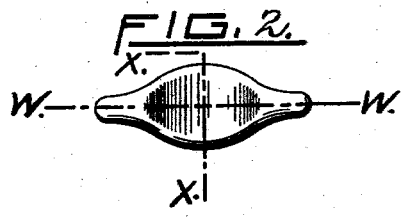
FIG. 2.
FIG. 4.
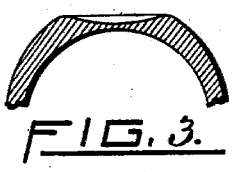
FIG. 3.
FIG. 5.
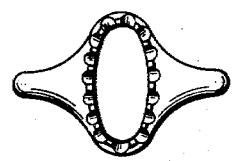
FIG. 8.
FIG. 6.
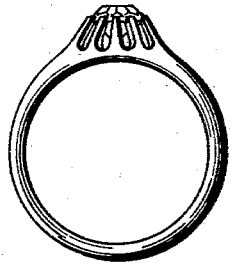
FIG. 7.
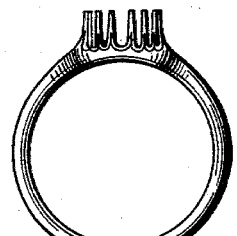
FIG. 9.
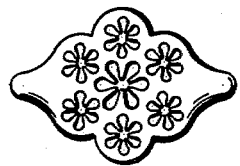
FIG. 10.
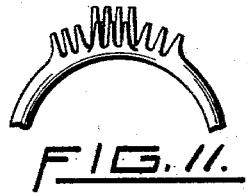
FIG. 11.
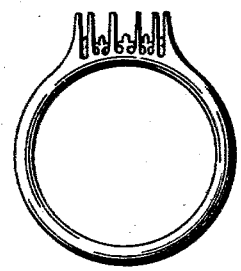
FIG. 13.
FIG. 14.
FIG. 12.
WITNESSES.
Charles T. Hannigan.
Howard A. Lamprey
INVENTOR.
Frank R. Stafford
by Warren R. Perce
Atty.
THE NORRIS PETERS CO., PHOTO-LITHO., WASHINGTON, D. C.

No. 739,759. PATENTED SEPT. 22, 1903.
F. R. STAFFORD.
GEM SETTING.
APPLICATION FILED SEPT. 28, 1901.
NO MODEL. 2 SHEETS—SHEET 2.

No. 739,759. Patented September 22, 1903.

UNITED STATES PATENT OFFICE.

FRANK R. STAFFORD, OF PROVIDENCE, RHODE ISLAND.

GEM-SETTING.

SPECIFICATION forming part of Letters Patent No. 739,759, dated September 22, 1903.

Application filed September 28, 1901. Serial No. 76,914. (No model.)

*To all whom it may concern:*

Figure 15:
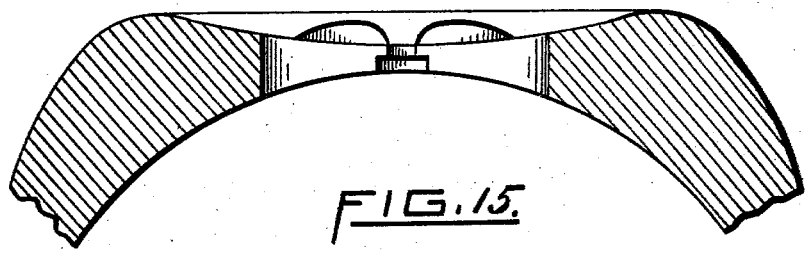
Figure 16:
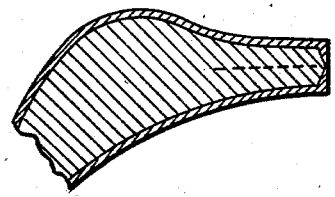
Figure 17:
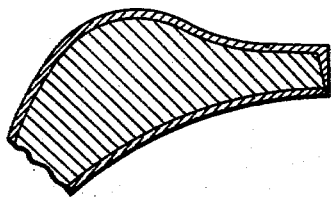

Be it known that I, FRANK R. STAFFORD, a citizen of the United States, residing at Providence, in the county of Providence and State of Rhode Island, have invented certain new and useful Improvements in Gem-Settings, of which the following is a specification, reference being had therein to the accompanying drawings.
Figure 1 is a top view of the blank from which a ring is to be made provided with my improved gem-setting. Fig. 2 is a front elevation of the same. Fig. 3 is a sectional view of the same as seen on line $w$ $w$ of Fig. 2.
Fig. 4 is a sectional view of the same as seen on line $x$ $x$ of Fig. 2. Fig. 5 is a front elevation of said ring-blank after the head thereof has been perforated for the purpose of forming the prongs of the setting. Fig. 6 is a sectional view of the same as seen on line $z$ $z$ of Fig. 5. Fig. 7 is a top plan view of the completed ring with the finished setting and the gem inclosed therein. Figs. 8, 9, 10, 11, 12, 13, and 14 illustrate modified forms of my improved gem-setting. Figs. 15, 16, and 17 are detail views each on an enlarged scale.

My invention relates to gem-settings for rings and other articles of jewelry; and it consists of the novel construction and combination of the several parts, as hereinafter particularly described, and specifically set forth in the claims.

In the drawings I illustrate my invention as applied to a finger-ring. In Fig. 1 is shown a blank from which a ring is formed provided with my improved gem-setting. This blank has a head, indicated in Fig. 1 as somewhat thicker than the other portions of the blank. This head is shown in elevation and cross-sections in Figs. 2, 3, and 4, in which it is seen that the same has an elliptically-shaped shallow concavity, all whose diameters are in the arcs of true circles, as shown in Figs. 3 and 4. By suitable dies and plungers the head of the ring-blank thus concaved is perforated to form a number of radially-arranged, equispaced, oblong, or other suitably-shaped holes or apertures, as seen in Fig. 5. The result of this operation is that there are left a number of equispaced inwardly-directed radial points, each of which has its upper surface concaved, as shown in Fig. 6, and its two opposite sides or edges converging and its inner end cut square off, as shown in Fig. 5. By a bur or other proper revolving tool the inner edges of all these points are shaped with an undercut, forming at the inner end of each point a seat for the holding of the gem, as shown in Fig. 15.
In the form illustrated in Figs. 5 and 6 the ring as thus far made constitutes a jeweler's finding for ring gem-settings. A plunger concentric with the central aperture of the head operates in the direction indicated by the arrow in Fig. 6 and bends all these points, so that they take the angular positions illustrated in Figs. 7 or 9, so forming a circular or oval series of prongs, the degree of the inclination of these prongs being determined by the shape of the thrusting end of the plunger used and the extent of its movement. A gem is inserted between these prongs, which are then bent down upon the gem in the usual manner to inclose and secure it in position.
In Figs. 8 and 9 I show how an oval series of prongs may be formed for the setting of gems or stones of that shape. In Figs. 10, 11, and 12 I show how a cluster of gem-settings can be formed, and in Fig. 13 I show a series of prongs with intermediate ornamental projections, all which can be made by the method above described by suitably shaping the perforations through the heads and afterward opening or spreading them out, as already explained.

It has been common heretofore in forming integral prong-settings to make a large knob or mass upon a wire, bar, or strip of stock by means of rollers or other suitable tools, then by dies to form on the surface of this solid knob or head a circular series of protuberances or radially-arranged ridges or projections, and then to bore through the center of this knob or head from top to bottom a circular hole by means of a milling-tool or otherwise, thereby removing the central portion of said knob or head and leaving each of the radial die-formed protuberances or projections, thus constituting them as a circular series of separate setting-prongs, or sometimes the solid knob or head has been diametrically cut through by a milling or other tool, leaving the intermediate projections to be formed into setting-prongs. These methods require a considerable number of operations, which must be carefully performed in order to obtain symmetrical and satisfactory results.

By my improved method the head is transformed into a gem-setting by three operations, the piercing of the head to produce the perforations described, the simultaneous cutting or burring to form the seats for the gem in the inner ends of the intermediate inwardly-converging radial points, and the outward spreading of said points to give them the proper radial direction. This method is much more rapid, less expensive, and productive of uniform and symmetrical results.

It is obvious that my improved method of manufacture is equally as effective and rapid in making an oval setting as a circular one, while the common methods hereinbefore described are adapted only to circular settings. I can as quickly form an elliptical or other shaped setting as a circular one by using dies and plungers having those forms.

By using a plurality of dies and plungers I can produce the cluster of settings illustrated in Figs. 10, 11, and 12 all integral with the ring. To produce such cluster settings heretofore, it has been necessary to form them from separate pieces of sheet metal struck up and cupped into the required shape and fastened in position by solder; but the heat of the soldering operation draws the temper of the stock, and the metal is softened thereby, so that the prongs thus made are easily bent by accident and lose their hold upon the inclosed jewel.

The methods of making gem-settings commonly used are not satisfactory in the manufacture of filled rings—that is, gold-plated rings the inner portion of which is composition or base metals. The boring or milling operations above described necessarily expose the base metal and cause the prongs to have a raw—that is, an exposed—edge or surface of base metal on their inner sides or surfaces, which soon is oxidized and discolored; but by giving to my dies which perforate the head of the ring properly-beveled cutting edges the upper and lower gold plates are carried over and drawn in until they meet in a single line or seam midway upon the edges of the prongs, as illustrated in Figs. 14 and 16, thus wholly covering the base metal and affording a continuous covering of gold, or by forming the die with a proper bevel, as well as with a cutting edge, the outer gold plate can be turned in and brought into contact with the inner gold plate on the inner edge of the prongs, (see Fig. 17,) thus giving a continuous gold surface.

The concaving of the head of the ring-blank shown in Figs. 2 to 5, inclusive, may, however, be dispensed with, in cases where the stock is sufficiently thin for the formation of prongs; but such modifications would be within the scope of my invention.

It is obvious that my improved method of making gem-settings is adapted not only to finger-rings, but to other articles of jewelry.

I claim as a novel and useful invention and desire to secure by Letters Patent—

1. The improved jeweler's finding herein described, consisting of a ring having a series of integral, radially-arranged prongs projecting toward each other in substantially the same plane, each of which has the outer surface concaved and its opposite cut edges converging toward each other, said prongs being adapted to be bent by a subsequent operation to project outwardly and angularly from the surface of the ring and being provided with means at their ends, respectively, for holding a gem between them after said bending operation, substantially as specified.

2. In combination with a gold-plated article of jewelry, a gem-setting integral therewith and consisting of a series of prongs extending outwardly from said article at equal angles, the interior portion of each of which prongs is base metal and each of which prongs has an upper gold plate and a lower gold plate constituting the exterior surface thereof and graduated in thickness at and near their edges which meet in a line upon each side of the prong, substantially as specified.

In testimony whereof I affix my signature in presence of two witnesses.

FRANK R. STAFFORD.

Witnesses:
  WARREN R. PERCE,
  HOWARD A. LAMPREY.